US012706741B2

(12) United States Patent
King et al.

(10) Patent No.: US 12,706,741 B2
(45) Date of Patent: Aug. 11, 2026

(54) SYSTEM AND METHOD FOR DATA SECURITY USING QUANTUM KEY DISTRIBUTION

(71) Applicant: Bank of America Corporation, Charlotte, NC (US)

(72) Inventors: Adam King, Fort Mill, SC (US); Coreen Marks, North Myrtle Beach, SC (US); Karishma Batra, Flintshire (GB); James Edward Bowden, Cheshire (GB); Camilla Solideo, Chicago, IL (US); Racquel Butler, Pineville, NC (US)

(73) Assignee: Bank of America Corporation, Charlotte, NC (US)

( * ) Notice: Subject to any disclaimer, the term of this patent is extended or adjusted under 35 U.S.C. 154(b) by 38 days.

(21) Appl. No.: 18/828,354

(22) Filed: Sep. 9, 2024

(65) Prior Publication Data

US 2026/0074896 A1 Mar. 12, 2026

(51) Int. Cl.
*H04L 9/08* (2006.01)
*H04L 9/00* (2022.01)

(52) U.S. Cl.
CPC .............. *H04L 9/0852* (2013.01); *H04L 9/50* (2022.05)

(58) Field of Classification Search
CPC . H04L 63/0442; H04L 9/0852; H04L 9/0855; H04L 9/3242; H04L 9/50
See application file for complete search history.

(56) References Cited

U.S. PATENT DOCUMENTS

| | | | |
|---|---|---|---|
| 7,905,415 | B2 | 3/2011 | Basson et al. |
| 8,638,942 | B2 | 1/2014 | Maeda et al. |
| 8,931,698 | B2 | 1/2015 | Ishikawa et al. |
| 9,680,640 | B2 | 6/2017 | Hughes et al. |
| 10,049,315 | B2 | 8/2018 | Chatterton et al. |
| 10,270,594 | B2 | 4/2019 | Castinado et al. |
| 10,348,493 | B2 | 7/2019 | Fu et al. |
| 10,839,395 | B2 | 11/2020 | Simons |
| 10,878,430 | B1 | 12/2020 | Yaqub |
| 11,308,559 | B1 | 4/2022 | Gordon, III et al. |

(Continued)

FOREIGN PATENT DOCUMENTS

| | | | |
|---|---|---|---|
| CN | 108092771 | B | 5/2018 |
| JP | 2003223620 | A | 8/2003 |
| KR | 102592873 | B1 | 5/2024 |

*Primary Examiner* — Olugbenga O Idowu

(57) ABSTRACT

A system for implementing a quantum-based data validation in a network is disclosed. The system generates a quantum key for data packet transmissions. The system distributes the quantum key among a set of end-point devices, where the set of end-point devices are each authorized devices. The system encrypts the data packet with the quantum key. The system receives a request message to access the data packet, where the request message comprises an identifier associated with a requesting device. The system determines whether the request message is originated from an authorized entity by determining whether the identifier associated with the requesting device is recorded as an authorized entity in a blockchain database. If it is determined that the request message is originated from an authorized entity, the system grants access of the data packet to the requesting device. Otherwise, the system denies the request.

20 Claims, 3 Drawing Sheets

(56) References Cited

U.S. PATENT DOCUMENTS

| | | | | |
|---|---|---|---|---|
| 11,424,918 | B2 | 8/2022 | Hay et al. | |
| 11,621,836 | B2 | 4/2023 | Ashrafi | |
| 11,769,154 | B1 | 9/2023 | Cash et al. | |
| 2007/0040023 | A1 | 2/2007 | Ruggirello et al. | |
| 2007/0130455 | A1 | 6/2007 | Elliott | |
| 2009/0050699 | A1 | 2/2009 | Basar et al. | |
| 2010/0030687 | A1 | 2/2010 | Panthaki et al. | |
| 2011/0006112 | A1 | 1/2011 | Mueller | |
| 2014/0048602 | A1 | 2/2014 | Yokomoto et al. | |
| 2017/0053249 | A1 | 2/2017 | Tunnell et al. | |
| 2024/0430080 | A1* | 12/2024 | Zhou | H04L 9/0855 |
| 2025/0240181 | A1* | 7/2025 | Khan | H04L 9/3239 |

* cited by examiner

SYSTEM AND METHOD FOR DATA SECURITY USING QUANTUM KEY DISTRIBUTION

TECHNICAL FIELD

The present disclosure relates generally to network security, and more specifically to a system and method for data security using quantum key distribution.

BACKGROUND

With the increase in the volume of data packet transmission on the Internet, the number of cyber-attacks has also increased. The data transfer process is vulnerable to cyber-attacks, especially with the rise of sophisticated attack vectors.

SUMMARY

The disclosed system, described in the present disclosure, is particularly integrated into a practical application of improving cyber-attack detection and mitigation, and data validation techniques. This practical application provides several technical advantages, including conserving computational and network resources that would otherwise be used to combat cyber-attacks, performing error correction and reduction, and retransmitting data packets that are initially compromised due to security breaches in a system, among others.

In current systems, organizations face challenges in maintaining the security and integrity of their data, particularly when sharing sensitive information with external entities and third-party entities. Traditional network protocols lack the robustness and adaptability required to increase data security across diverse environments where multiple entities have access to sensitive information. Moreover, the increasing sophistication of cyber threats necessitates the development of technical solutions to protect sensitive data and maintain regulatory compliance.

The disclosed system is configured to provide a technical solution to these and other technical problems currently arising in the realm of network security, especially in environments where multiple entities (e.g., internal and external entities) may access sensitive information associated with the organization. The disclosed system is configured to address the complex security and compliance requirements of organizations in an interconnected digital ecosystem. In some embodiments, by leveraging quantum computing principles and decentralized consensus mechanisms, the disclosed system establishes a secure framework for data transmission, storage, and processing.

In some embodiments, the disclosed system is configured to provide comprehensive security for organizations both internally and when interacting with external entities and third parties. In some embodiments, the disclosed system may use quantum key distribution to secure communication channels within the organization's network infrastructure. This facilitates that internal communications, including communicating sensitive information and data exchanges between departments and systems, are protected from eavesdropping and interception by unauthorized entities.

In some embodiments, the disclosed system may implement quantum-resistant cryptography techniques to employ post-quantum cryptographic algorithms to secure internal data transmissions and storage. The implemented cryptographic algorithms are resilient against attacks from both classical and quantum adversaries, and facilitate the confidentiality and integrity of sensitive information stored and processed within the organization's network.

In some embodiments, the disclosed system may implement quantum-secure data tracking techniques to incorporate advanced data tracking mechanisms to monitor internal data flows. By leveraging quantum-secure digital signatures and immutable records of data flows, the disclosed system enables the organization to track the provenance and integrity of internal data. This, in turn, leads to improvement in data flow tracking based on the immutable records of the data flows.

In some embodiments, the disclosed system may use quantum key distribution when communicating with external entities and third parties. The disclosed system may utilize quantum key distribution to establish secure channels for data exchange. This may facilitate that sensitive information transmitted between the organization and external entities remains confidential, even in the presence of adversaries.

In some embodiments, the disclosed system may use quantum-resistant cryptography techniques to employ post-quantum cryptographic algorithms to protect data exchanged with external parties. In some cases, the external parties may not be equipped with data security measures to secure received data. However, even in such cases, using quantum-resistant cryptography facilitates that data integrity is maintained throughout the communication process.

In some embodiments, the disclosed system may implement quantum-secure data tracking techniques to enable the organization to track the lifecycle of data shared with external entities and third parties. By using quantum-secure digital signatures and immutable records of data flows, the disclosed system provides transparent and verifiable evidence of data origin and its network path, and that information is kept up to the organization's standard of security and protection even when accessed by external entities.

Thus, the disclosed system provides practical applications and technical improvements, including increasing the security of data transmission within a network, quantum encryption key validation techniques, and data validation techniques through quantum key validation. For example, the disclosed system distributes quantum keys to a network of authorized devices to encrypt each data packet before transmitting, and in response to an authorized device receiving an encrypted data packet that is encrypted with a respective quantum key, the receiving device may validate the data packet by determining whether the data packet can be decrypted by the respective quantum key. If the data packet can be decrypted by the respective quantum key, the receiving device may determine that the data packet is originated from an authorized device. Otherwise, the receiving device may determine that the data packet is originated from a malicious device. This, in turn, leads to improving the security of data stored at the devices involved in the data transmissions. Further, this, in turn, reduces the processing, memory, and network resources of these devices. For example, by improving the data transmission validation techniques, the devices do not have to allocate an extensive amount of processing and memory resources to combat cyber-attacks.

In some embodiments, a system comprises a memory operably coupled with a processor. The memory is configured to store a data packet. The processor is configured to generate a quantum key for data packet transmissions. The processor is further configured to distribute the quantum key among a set of end-point devices, wherein each of the set of end-point devices is an authorized device. The processor is further configured to encrypt the data packet with the quantum key. The processor is further configured to store the encrypted data packet in a blockchain database. The processor is further configured to receive a request message to access the data packet, wherein the request message comprises an identifier associated with a requesting device. The processor is further configured to determine whether the request message is originated from an authorized entity by determining whether the identifier associated with the requesting device is recorded as an authorized entity in the blockchain database in response to receiving the request message. The processor is further configured to grant access of the data packet to the requesting device in response to determining that the request message is originated from an authorized entity.

Some embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
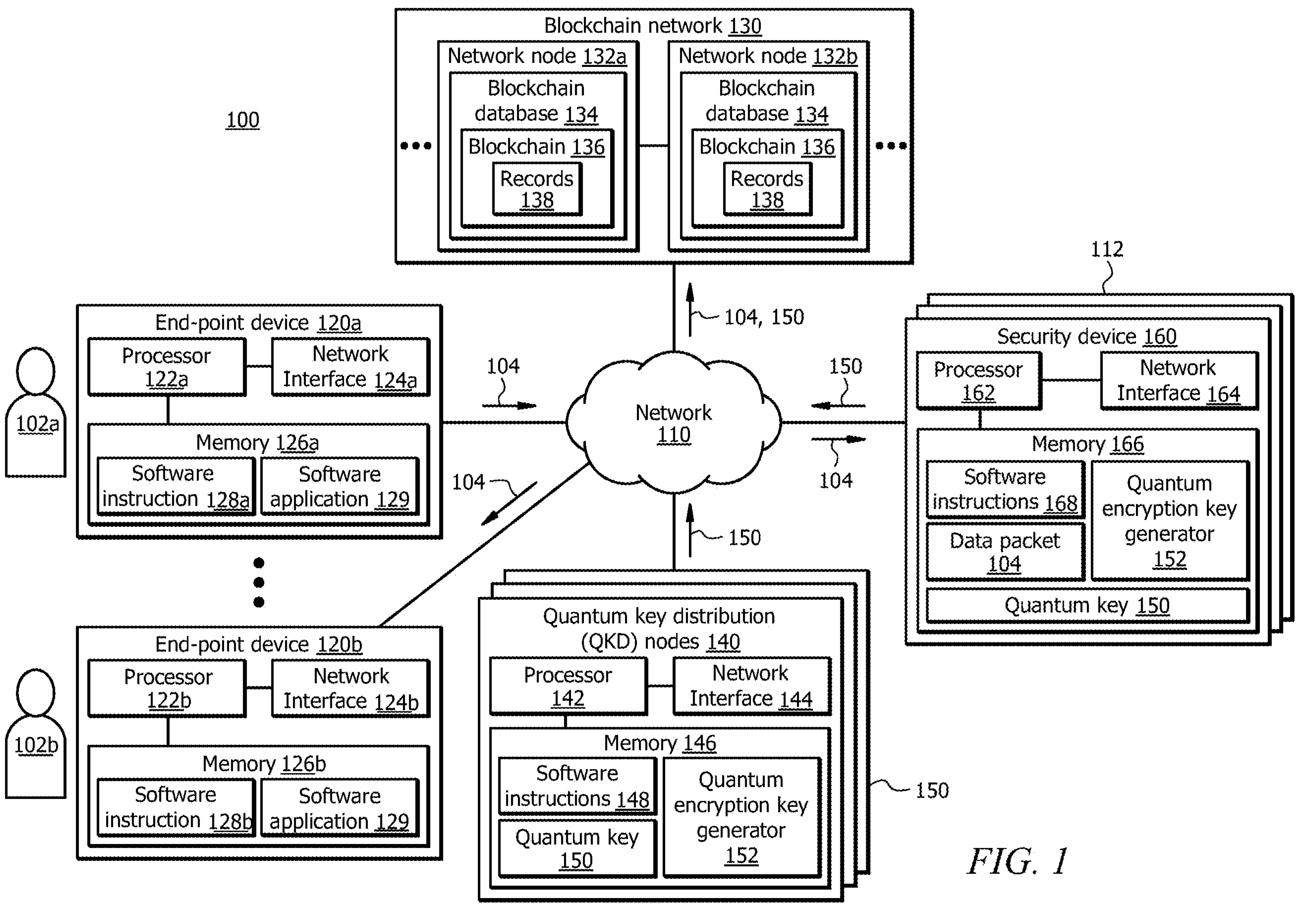
FIG. 1 illustrates an embodiment of a system for quantum-enabled data validation in a network.
Figure 2:
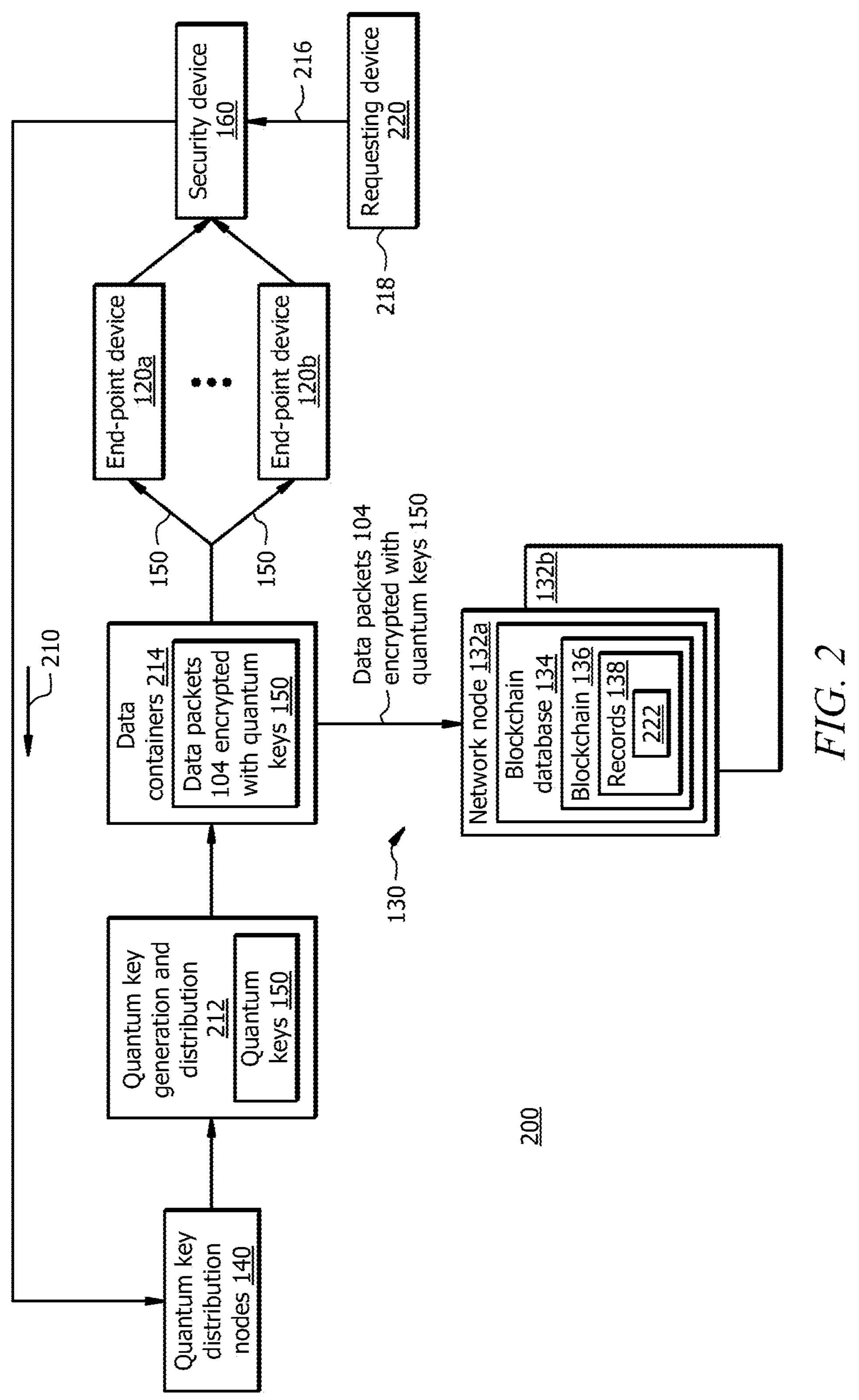
FIG. 2 illustrates an example operational flow of the system of FIG. 1.
Figure 3:
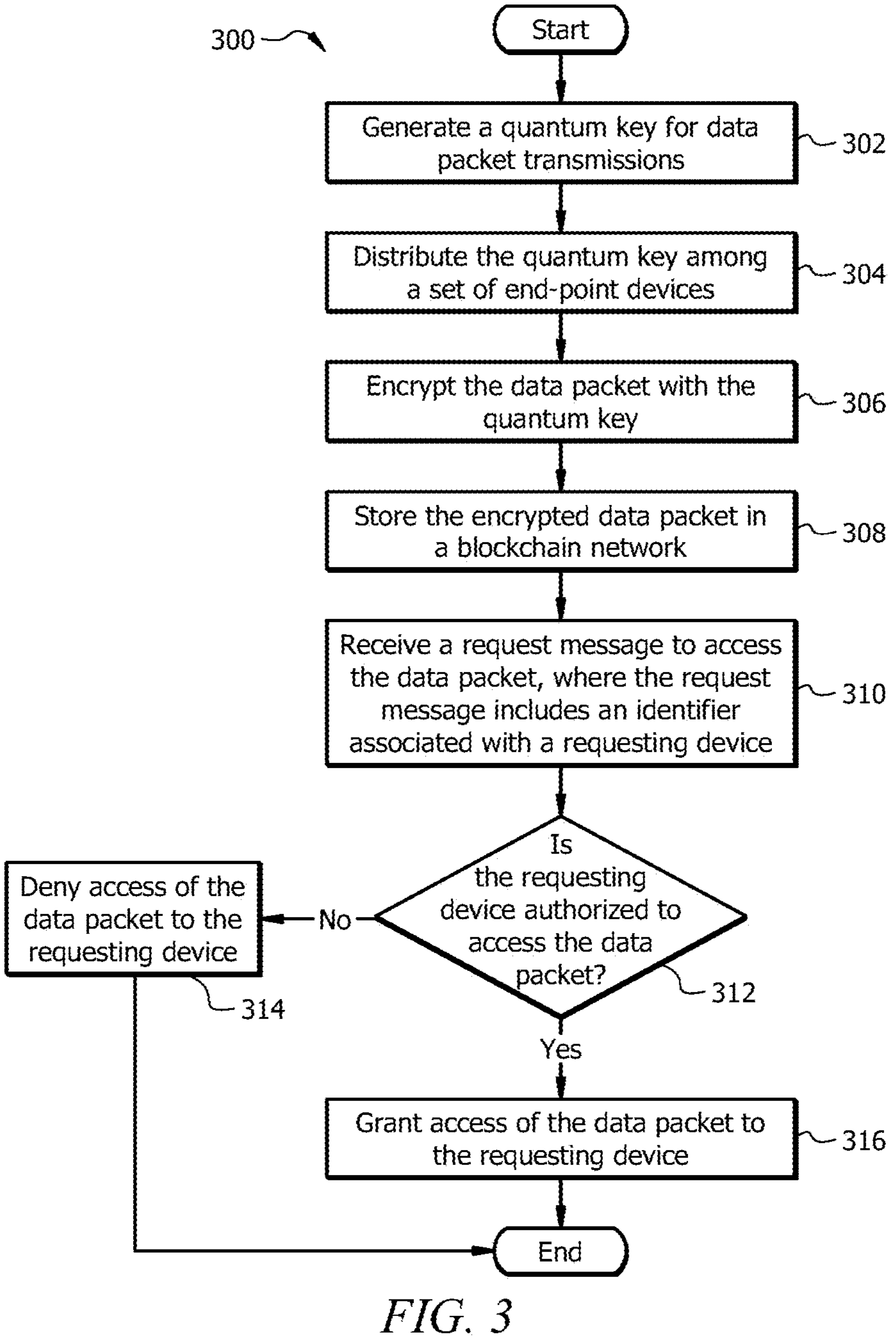
FIG. 3 illustrates an example flow chart of a method of the system of FIG. 1.

As described above, previous technologies fail to provide efficient and reliable solutions for quantum-enabled data validation in a network. Embodiments of the present disclosure and its advantages may be understood by referring to FIGS. 1 through 3. FIGS. 1 through 3 are used to describe systems and methods for quantum-enabled data validation in a network, according to some embodiments.

System Overview

FIG. 1 illustrates an embodiment of a system 100 that is generally configured to implement quantum-enabled data validation using quantum key distribution (QKD) to secure and validate data packet transmissions within a network. In some embodiments, the system 100 comprises a security device 160 communicatively coupled with a set of end-point devices 120*a-b*, a blockchain network 130, and a set of quantum key distribution nodes 140 via a network 110. Network 110 enables the communication among the components of the system 100. Users 102 may use the end-point devices 120*a-b* to communicate data via the network 110. Each end-point device 120*a-b* may be provided with a quantum key to encrypt or decrypt data. The blockchain network 130 may store information in a distributed database that may be used by other components of the system 100. In some embodiments, the quantum key distribution nodes 140 may be configured to generate and distribute quantum keys among the end-point devices 120*a-b*. In some embodiments, the security device 160 may be configured to generate and distribute quantum keys among the end-point devices 120*a-b*. In other embodiments, system 100 may not have all of the components listed and/or may have other elements instead of, or in addition to, those listed above.

In general, the system 100 improves cyber-attack detection and mitigation techniques. In current systems, organizations face challenges in maintaining the security and integrity of their data, particularly when sharing sensitive information with external entities and third-party entities. Traditional network protocols lack the robustness and adaptability required to ensure data security across diverse environments where multiple entities have access to sensitive information. Moreover, the increasing sophistication of cyber threats requires the development of technical solutions to protect sensitive data and maintain regulatory compliance.

The disclosed system 100 is configured to provide a technical solution to these and other technical problems currently arising in the realm of network security, especially in environments where multiple entities (e.g., internal and external entities) may access sensitive information associated with the organization. The disclosed system 100 is configured to address the complex security and compliance requirements of organizations in an interconnected digital ecosystem. In some embodiments, by leveraging quantum computing principles and decentralized consensus mechanisms, the disclosed system 100 establishes a secure and resilient framework for data transmission, storage, and processing.

In some embodiments, the disclosed system 100 is configured to provide comprehensive security for organizations both internally and when interacting with external entities and third parties. In some embodiments, the disclosed system 100 may use quantum key distribution to secure communication channels within the organization's network infrastructure. This may facilitate that internal communications, including communicating sensitive information and data exchanges between departments and systems, are protected from eavesdropping and interception by unauthorized entities.

In some embodiments, the disclosed system 100 may implement quantum-resistant cryptography techniques to employ post-quantum cryptographic algorithms to secure internal data transmissions and storage. The implemented cryptographic algorithms are resilient against attacks from both classical and quantum adversaries, and facilitate the confidentiality and integrity of sensitive information stored and processed within the organization's network.

In some embodiments, the disclosed system 100 may implement quantum-secure data tracking techniques to incorporate advanced data tracking mechanisms to monitor internal data flows. By leveraging quantum-secure digital signatures and immutable records of data flows, the disclosed system 100 enables the organization to track the provenance and integrity of internal data. This, in turn, leads to compliance with regulatory standards and internal policies.

In some embodiments, the disclosed system 100 may use quantum key distribution when communicating with external entities and third parties. The disclosed system 100 may utilize quantum key distribution to establish secure channels for data exchange. This facilitates that sensitive information transmitted between the organization and external entities remains confidential, even in the presence of adversaries.

In some embodiments, the disclosed system 100 may use quantum-resistant cryptography techniques to employ post-quantum cryptographic algorithms to protect data exchanged with external parties. In some cases, the external parties may not be equipped with data security measures to secure received data. However, even in such cases, using quantum-resistant cryptography facilitates that data integrity is maintained throughout the communication process.

In some embodiments, the disclosed system 100 may implement quantum-secure data tracking techniques to enable the organization to track the lifecycle of data shared with external entities and third parties. By using quantum-secure digital signatures and immutable records of data flows, the disclosed system 100 provides transparent and verifiable evidence of data origin and network path of the data, and that information is kept up to the organization's standard of security and protection even when accessed by external entities.

Thus, the disclosed system 100 provides practical applications and technical improvements, including improving the security of data transmission within a network, resilient quantum encryption key validation techniques, and data validation techniques through quantum key validation. For example, the disclosed system distributes quantum keys to a network of authorized devices 120*a-b* to encrypt each data packet 104 before transmitting, and in response to an authorized device 120*b* receiving an encrypted data packet 104 that is encrypted with a respective quantum key 150, the receiving device 120*b* may validate the data packet 104, e.g., by determining whether the data packet 104 can be decrypted by the respective quantum key 150. If the data packet 104 can be decrypted by the respective quantum key 150, the receiving device 120*b* may determine that the data packet 104 is originated from an authorized device 120*a*. Otherwise, the receiving device 120*b* may determine that the data packet 104 is originated from a malicious device. This, in turn, leads to increasing the security of data stored at the devices involved in the data transmissions. Further, this, in turn, reduces the processing, memory, and network resources of these devices. For example, by improving the data transmission validation techniques, the devices do not have to allocate an extensive amount of processing and memory resources to combat cyber-attacks.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., Wi-Fi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may include fiber optics, optical fibers, and the like to implement quantum communication channels. The network 110 may be configured to support any suitable type of communication protocol as would be appreciated by one of ordinary skill in the art.

Example End-Point Device

Each of the end-point devices 120*a-b* is an instance of an end-point device 120. Each of the end-point devices 120*a-b* is a same as or substantially similar to an end-point device 120. The end-point device 120 may be generally any device that is configured to process data and interact with users 102*a-b*. Examples of the end-point device 120 include but are not limited to, a personal computer, a desktop computer, a workstation, a server, a laptop, a tablet computer, a mobile phone (such as a smartphone), smart glasses, virtual reality (VR) glasses, a virtual reality device, an augmented reality device, an internet-of-things (IoT) device, or any other suitable type of device. The end-point device 120 may include a user interface, such as a display, a microphone, a camera, a keypad, or other appropriate terminal equipment usable by users 102. The end-point device 120 may include a hardware processor, memory, and/or circuitry configured to perform any of the functions or actions of the end-point device 120 described herein. In the present disclosure, the end-point device 120 may be interchangeably referred to as a computing device or a user device.

Each end-point device 120 includes a processor in signal communication with a network interface and a memory. The memory stores software instructions that when executed by the processor cause the processor to perform one or more operations of the end-point device described herein. The end-point device 120 is configured to communicate with other devices and components of the system 100 via the network 110. A user 102 may use an end-point device 120 to transmit a data packet 104 to another device (e.g., another end-point device 120*b*). In some examples, the data packet 104 may include documents, data records, code, and media files (e.g., audio, video, image), among other data that may be transmitted via the network 110. The end-point device 120 may be used to initiate a transfer of data packet 104 via the network 110. The data packet 104 may be packaged in a data container for data transmission. In some embodiments, each end-point device 120 may be provided with a quantum key 150 to encrypt a data packet 104 before transmission and decrypt and validate a data packet 104 upon reception.

End-point device 120 may comprise a processor 122 operably coupled with a network interface 124 and a memory 126. The end-point device 120*a-b* may comprise a processor 122*a-b* operably coupled with a network interface 124*a-b* and a memory 126*a-b*, respectively. Processor 122*a* comprises one or more processors. The processor 122*a* is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 122*a* may be a programmable logic device, a microcontroller, a microprocessor, or any suitable number and combination of the preceding. The one or more processors are configured to process data and may be implemented in hardware or software. For example, the processor 122*a* may be 8-bit, 16-bit, 32-bit, 64-bit, or of any other suitable architecture. The processor 122*a* may include an arithmetic logic unit (ALU) for performing arithmetic and logic operations. The processor 122*a* may register the supply operands to the ALU and store the results of ALU operations. The processor 122*a* may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 128*a*) to perform the operations of the end-point device 120*a* described herein. In this way, processor 122*a* may be a special-purpose computer designed to implement the functions disclosed herein. In an embodiment, the processor 122*a* is implemented using logic units, FPGAs, ASICs, DSPs, or any other suitable hardware. The processor 122*a* is configured to operate as described in FIGS. 1-3. For example, the processor 122*a* may be configured to perform one or more operations of the operational flow 200 of the system 100 described in FIG. 2 and one or more operations of the method 300 as described in FIG. 3.

Network interface 124*a* is configured to enable wired and/or wireless communications. The network interface 124*a* may be configured to communicate data between the end-point device 120*a* and other devices, systems, or domains. For example, the network interface 124*a* may comprise an NFC interface, a Bluetooth interface, a Zigbee interface, a Z-Wave interface, a radio-frequency identification (RFID) interface, a Wi-Fi interface, a LAN interface, a WAN interface, a MAN interface, a PAN interface, a WPAN interface, a modem, a switch, and/or a router. The processor 122*a* may be configured to send and receive data using the network interface 124*a*. The network interface 124*a* may be configured to use any suitable type of communication protocol.

The memory 126*a* may be a non-transitory computer-readable medium. The memory 126*a* may be volatile or non-volatile and may comprise read-only memory (ROM), random-access memory (RAM), ternary content-addressable memory (TCAM), dynamic random-access memory (DRAM), and/or static random-access memory (SRAM). The memory 126*a* may include one or more of a local database, a cloud database, a network-attached storage (NAS), etc. The memory 126*a* comprises one or more disks, tape drives, or solid-state drives, and may be used as an over-flow data storage device, to store programs when such programs are selected for execution, and to store instructions and data that are read during program execution. The memory 126*a* may store any of the information described in FIGS. 1-3 along with any other data, instructions, logic, rules, or code operable to implement the function(s) described herein when executed by processor 122*a*. For example, the memory 126*a* may store software instructions 128*a*, quantum encryption algorithm 154, software application 129, and/or any other data or instructions. The software instructions 128*a* may comprise any suitable set of instructions, logic, rules, or code operable to execute the processor 122*a* and perform the functions described herein, such as some or all of those described in FIGS. 1-3.

The quantum encryption algorithm 154 may be implemented by the processor 122*a* executing software instructions 128*a* and is generally configured to encrypt data packets 104 with encryption keys 150. In some embodiments, the quantum encryption algorithm 154 may be implemented by a computing device using the quantum key 150 to encrypt and decrypt data packet 104. For example, a user device 120*a* may encrypt the data packet 104 using the quantum encryption algorithm 154 before transmitting it to another user device 120*a*. When the data packet 104 is received at the intended user device 120*a*, the user device 120*a* may use the quantum encryption algorithm 154 to decrypt the data packet 104 using the encryption key 150.

The software application 129 may be a web, mobile, or desktop software application and is generally configured to perform operations on data packets 104. For example, the software application 129 may perform data transformation, execute a query (e.g., structured query language (SQL) query), machine learning operations, compile code, and other operations on the data packet 104.

The components of the end-point device 120*b* are the same or substantially similar to that of the end-point device 120*a*, similar to that described above. The end-point device 120*b* may comprise a processor 122*b* operably coupled with a network interface 124*b* and a memory 126*b*. The processor 122*b* may be the same or substantially similar to the processor 122*a*, the network interface 124*b* may be the same or substantially similar to the network interface 124*b*, and the memory 126*b* may be the same or substantially similar to the memory 126*b*. The memory 126*b* may store any of the information described in FIGS. 1-3 along with any other data, instructions, logic, rules, or code operable to implement the function(s) described herein when executed by processor 122*b*. For example, the memory 126*b* may store software instructions 128*b*, quantum encryption algorithm 154, software application 129, and/or any other data or instructions. The software instructions 128*b* may comprise any suitable set of instructions, logic, rules, or code operable to execute the processor 122*b* and perform the functions described herein, such as some or all of those described in FIGS. 1-3.

Blockchain Network

Blockchain network 130 is a peer-to-peer network of network nodes 132*a-b*, and is generally configured to distribute records 138 (and any other data/information) among the network nodes 132*a-b*. In some embodiments, the blockchain network 130 comprises a distributed database in a network of network nodes 132*a-b*. In some embodiments, blockchain network 130 may be a public blockchain network. In some embodiments, blockchain network 130 may be a private blockchain network associated with a particular organization 112. For example, membership in blockchain network 130 may be limited to nodes registered as belonging to and/or affiliated with the organization 112 to which the security device 160 belongs. In some embodiments, the security device 160 may be a member of blockchain network 130 (e.g., as a node among nodes 132*a-b* in blockchain network 130). The records 138 may comprise information about the flow of data packets 104 within the network, smart contract data, records of devices that are authorized to communicate (send and/or receive) data packets 104 associated with the organization 112 to which the security device 160 associated and any other relevant information, for example, for operation and validation of the blockchain 136, data packets 104, quantum keys 150, among other information.

The blockchain network 130 may comprise any number of network nodes 132*a-b* to form a distributed network that maintains the records 138. Each network node 132*a-b* is an instance of a network node 132. Each network node 132 may comprise a computing device, a virtual machine, a server, a workstation, and/or the like. Each network node 132*a-b* of blockchain network 130 stores a blockchain database 134 that is configured to store a copy of the records 138. Each network node 132 may include a hardware processor, memory, and/or circuitry (not explicitly shown) configured to perform any of the functions or actions of the network node 132 described herein. For example, a software application designed using software code may be stored in the memory and executed by the processor to perform the functions of the network node 132. The network node 132 is configured to communicate with other devices and components of the system 100 via the network 110.

In certain embodiments, the security device 160 may access the blockchain network 130 via the network 110 to distribute information in the blockchain network 130, including the records 138. The blockchain network 130 may be configured to distribute records 138 among the nodes 132*a-b*. The security device 160 may use an application programming interface (API) service via the network 110 to access the blockchain network 130.

The blockchain network 130 is configured to establish consensus among the network nodes 132*a-b* about the present state of the blockchain database 134. For example, each network node 132*a-b* comprises a processor in signal communication with a memory storing software instructions that when executed by the processor, cause the network nodes 132*a-b* to implement a consensus protocol procedure through which all the network nodes 132*a-b* of the blockchain network 130 reach a common agreement about the present state of the blockchain database 134. In this way, each network node 132*a-b* achieves reliability in the blockchain network 130 and establishes trust between the network nodes 132*a-b* in a distributed computing environment. Essentially, the consensus protocol makes sure that every new block that is added to the blockchain 136 is the one and only version of the truth that is agreed upon by all the blocks in the blockchain 136. In some examples, the consensus protocol may include but is not limited to, proof of work, proof of stake, or any other suitable consensus algorithm.

The blockchain 136 links together blocks of data, which store identifiable units called blockchain data entries (e.g., records 138). The records 138 may be interchangeably referred to herein as blockchain data entries. The records 138 stored in the blockchain 136, may include information, files, and/or any other suitable type of data. For example, the records 138 may include information/data received from the security device 160, quantum key distribution nodes 140, and end-point devices 120*a-b*. Each record 138 may be associated with a different interaction session between two or more end-point devices 120*a-b* and/or other devices, where during the interaction session, a data packet 104 may be communicated from a sending entity to a receiving entity. For example, for an interaction session, a record 138 may include information about a sending entity (e.g., a first end-point device 120*a* or another device), information about a receiving entity (e.g., a second end-point device 120*b* or another device), authentication token, data packet 104 transferred (e.g., software and/or hardware services), a timestamp of each data transfer, a data flow of the data packet 104 along a network path from the sending entity to the receiving entity, and/or any other information. With every new data transfer (e.g., every new interaction session), a new block of data may be generated and added to the blockchain 136. For example, with each data packet transmission, a new block is generated and the events associated with the data packet transmission are recorded in the new block in the blockchain 136.

Each block in the blockchain 136 comprises a block identifier (ID) and information derived from a preceding block. For example, every block in the blockchain 136 includes a hash of the previous block. By including the hash, the blockchain 136 comprises a chain of blocks from a genesis block (e.g., the first block) to the current block. Each block is guaranteed to come after the previous block chronologically because the previous block's hash would otherwise not be known. In one embodiment, blocks in a blockchain 136 may be linked together by identifying a preceding block with a cryptographic checksum (e.g. secure hash algorithm (SHA)-256) of its contents (e.g., the records 138 and additional metadata including block ID, hash value, and previous block hash value) which serves as each block's unique identifier. Links are formed by storing the cryptographic checksum identifier of one block in the metadata of another block, such that the former block becomes the predecessor of the latter block. In this way, the blocks form a chain that can be navigated from block to block by retrieving the cryptographic checksum of a particular block's predecessor from the particular block's metadata. Each block is computationally impractical to modify once it has been in the blockchain because every block after it would also have to be regenerated. These features protect data stored in the blockchain 136 from being modified by bad actors which provides information security. When a network node 132 creates an entry (e.g. one or more records 138 in a block of the blockchain 136), the blockchain 136 for all other network nodes 132 in the distributed network is also updated with the new entry. Thus, data entered in a blockchain 136 is available and accessible to every network node 132 with a copy of the blockchain database 134. This allows the data stored in the blocks of the blockchain 136 to be accessible for inspection and verification at any time by any device with a copy of the blockchain database 134. The blockchain network 130 and/or the security device 160 may generate a new block in the blockchain 136 for each data transfer of a data packet 104 in a network, attempt to access a data packet 104, and other events associated with data packets 104. This information may be added to the existing records 138 and used by the security device 160 to further improve identifying, detecting, and mitigating future instances of unauthorized attempts to access data packets 104.

Quantum Key Distribution Nodes

Each quantum key distribution node 140 may be a computing device (e.g., a quantum computing device, a semiconductor-based computing device, etc.), a virtual machine, a server, a network node, a workstation, and/or the like. In certain embodiments, the quantum key distribution nodes 140 may be implemented by a cluster of computing devices. For example, the quantum key distribution nodes 140 may be implemented by a plurality of computing devices using distributed computing and/or cloud computing systems in a network. In certain embodiments, the quantum key distribution nodes 140 may be configured to provide services and resources (e.g., data and/or hardware resources, such as the quantum keys 150, etc.) to other components and devices.

Each quantum key distribution node 140 may comprise a processor 142 operably coupled with a network interface 144 and a memory 146. Processor 142 comprises one or more processors. The processor 142 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 142 may be a programmable logic device, a microcontroller, a microprocessor, or any suitable number and combination of the preceding. The one or more processors are configured to process data and may be implemented in hardware or software. For example, the processor 142 may be 8-bit, 16-bit, 32-bit, 64-bit, or of any other suitable architecture. The processor 142 may include an ALU for performing arithmetic and logic operations. The processor 142 may register the supply operands to the ALU and store the results of ALU operations. The processor 142 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 148) to perform the operations of the quantum key distribution node 140 described herein. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-3. For example, the processor 142 may be configured to perform one or more operations of the operational flow 200 of the system 100 described in FIG. 2 and one or more operations of the method 300 as described in FIG. 3.

Network interface 144 is configured to enable wired and/or wireless communications. The network interface 144 may be configured to communicate data between the quantum key distribution node 140 and other devices, systems, or domains. For example, the network interface 144 may comprise an NFC interface, a Bluetooth interface, a Zigbee interface, a Z-Wave interface, a RFID interface, a Wi-Fi interface, a LAN interface, a WAN interface, a MAN interface, a PAN interface, a WPAN interface, a modem, a switch, and/or a router. The processor 142 may be configured to send and receive data using the network interface 144. The network interface 144 may be configured to use any suitable type of communication protocol.

The memory 146 may be a non-transitory computer-readable medium. The memory 146 may be volatile or non-volatile and may comprise ROM, RAM, TCAM, DRAM, and/or SRAM. The memory 146 may include one or more of a local database, a cloud database, a NAS, etc. The memory 146 comprises one or more disks, tape drives, or solid-state drives, and may be used as an over-flow data storage device, to store programs when such programs are selected for execution, and to store instructions and data that are read during program execution. The memory 146 may store any of the information described in FIGS. 1-3 along with any other data, instructions, logic, rules, or code operable to implement the function(s) described herein when executed by processor 142. For example, the memory 146 may store software instructions 148, quantum keys 150, quantum encryption key generator 152, and/or any other data or instructions. The software instructions 148 may comprise any suitable set of instructions, logic, rules, or code operable to execute the processor 142 and perform the functions described herein, such as some or all of those described in FIGS. 1-3.

The quantum encryption key generator 152 may be implemented by the processor 142 executing the software instruction 148 and configured to generate quantum encryption/decryption keys 150. In some embodiments, the quantum encryption key generator 152 may include quantum cryptography algorithms, among other algorithms. In some embodiments, the quantum encryption key generator 152 may be implemented by the principles of quantum mechanics to create the quantum encryption key 150 that is resilient to cyberattacks, including non-quantum cyberattacks from traditional computer systems and quantum cyberattacks from quantum computer systems. To this end, the quantum encryption key generator 152 generates the quantum encryption key 150 which has a set of quantum states. In some examples, the quantum states may be represented as quantum bits (Qubits). The Qubits may represent quantum uncertainty, where their values are not defined or known until measured with a correct or predefined measurement basis. In some examples, the Qubits may include four quantum states, 00, 01, 10, and 11.

The process of generating the quantum encryption key 150 may include generating the set of quantum states of the quantum encryption key 150 according to the principle of quantum mechanics. For example, the set of quantum states may have and exhibit quantum properties, such as superposition and entanglement. The quantum encryption key generator 152 may arrange the quantum states (for example, the Qubits) in a particular arrangement that may be used to detect any deviation from the particular arrangement as an unauthorized attempt to access the data packet 104 encrypted with the quantum key 150.

In some embodiments, the quantum encryption key generator 152 may be, included, or executed in conjunction with a quantum circuit that is configured to generate the quantum encryption key 150 based on the quantum cryptography algorithms. For example, the quantum circuit may be or include a physical representation of a series of quantum operations or quantum gates that are applied to the set of Qubits to perform quantum computation to generate the quantum keys 150 and other operations. The quantum property of the quantum encryption key 150 may provide a quantum representation as Qubits to encode with (e.g., encrypt) the data packet 104.

The generated quantum encryption key 150 has quantum states of particles, such as photons. The quantum encryption key 150 may be generated by encoding information in the quantum states of each photon. The quantum encryption key generator 152 may generate a random sequence of quantum states (e.g., Qubits) for the quantum encryption key 150. These Qubits are sent to the user device **120*a* over a quantum distribution channel included as a part of the network 110. The quantum encryption key generator 152 prepares the quantum states to generate the quantum encryption key 150. The quantum states are used to generate the quantum encryption key 150 based on various properties of photons, such as their polarization or the basis on which they are measured. The user device 120*b* receives the quantum states of the quantum encryption key 150 and measures them based on a predefined measurement basis that is previously provided to the user device 120*b*. Thus, the user device 120*b* may obtain the quantum encryption key 150 based on the predefined measurement basis. Since the sender device (e.g., the user device 120*a*) and the receiver device (e.g., the user device 120*b*) share the same quantum states and the measurements at the receiver device align with the preparation of the quantum states at the sender device, these devices may use the quantum distribution channel (e.g., as a part of the network 110) for secure communication of the data packet 104 and quantum encryption key 150. If a bad actor attempts to access the data packet 104 encrypted with the quantum key 150, the quantum state of the key gets disturbed and this anomaly is detected by the security device 160, the end-point device 120*a*, and end-point device 120*b*. These devices may generate alert messages indicating the attempt to access the data packet 104** and display the alert messages on their display screens.

In another anomaly detection scenario, if the data packet 104 is attempted to be decrypted without the predefined measurements set for measuring the quantum state of the encryption key 150, this discrepancy leads to misalignment in the quantum states of the encryption key 150. Therefore, this anomaly is detected by the security device 160, the end-point device **120*a*, and end-point device 120*b*. These devices may generate alert messages indicating the attempt to access the data packet 104** and display the alert messages on their display screens.

Security Device

The security device 160 generally includes a hardware computer system configured to implement a quantum-based data transmission, quantum-enabled data validation using quantum key distribution to secure and validate data packet transmissions within a network, and anomaly detection and mitigation in a network, among others. In certain embodiments, the security device 160 may be implemented by a cluster of computing devices, such as virtual machines. For example, the security device 160 may be implemented by a plurality of computing devices using distributed computing and/or cloud computing systems in a network. In certain embodiments, the security device 160 may be configured to provide services and resources (e.g., data and/or hardware resources, quantum keys 150, countermeasure actions, etc.) to other components and devices. In some embodiments, the security device 160 may be among the quantum key distribution nodes 140.

Security device 160 may comprise a processor 162 operably coupled with a network interface 164 and a memory 166. Processor 162 comprises one or more processors. The processor 162 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 162 may be a programmable logic device, a microcontroller, a microprocessor, or any suitable number and combination of the preceding. The one or more processors are configured to process data and may be implemented in hardware or software. For example, the processor 162 may be 8-bit, 16-bit, 32-bit, 64-bit, or of any other suitable architecture. The processor 162 may include an ALU for performing arithmetic and logic operations. The processor 162 may register the supply operands to the ALU and store the results of ALU operations. The processor 162 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 168) to perform the operations of the security device 160 described herein. In this way, processor 162 may be a special-purpose computer designed to implement the functions disclosed herein. In an embodiment, the processor 162 is implemented using logic units, FPGAs, ASICs, DSPs, or any other suitable hardware. The processor 162 is configured to operate as described in FIGS. 1-3. For example, the processor 162 may be configured to perform one or more operations of the operational flow 200 of the system 100 described in FIG. 2 and one or more operations of the method 300 as described in FIG. 3.

Network interface 164 is configured to enable wired and/or wireless communications. The network interface 164 may be configured to communicate data between the security device 160 and other devices, systems, or domains. For example, the network interface 164 may comprise an NFC interface, a Bluetooth interface, a Zigbee interface, a Z-Wave interface, a RFID interface, a Wi-Fi interface, a LAN interface, a WAN interface, a MAN interface, a PAN interface, a WPAN interface, a modem, a switch, and/or a router. The processor 162 may be configured to send and receive data using the network interface 164. The network interface 164 may be configured to use any suitable type of communication protocol.

The memory 166 may be a non-transitory computer-readable medium. The memory 166 may be volatile or non-volatile and may comprise ROM, RAM, TCAM, DRAM, and/or SRAM. The memory 166 may include one or more of a local database, a cloud database, a NAS, etc. The memory 166 comprises one or more disks, tape drives, or solid-state drives, and may be used as an over-flow data storage device, to store programs when such programs are selected for execution, and to store instructions and data that are read during program execution. The memory 166 may store any of the information described in FIGS. 1-3 along with any other data, instructions, logic, rules, or code operable to implement the function(s) described herein when executed by processor 162. For example, the memory 166 may store software instructions 168, quantum keys 150, quantum encryption key generator 152, quantum encryption algorithm 154, and/or any other data or instructions. The software instructions 168 may comprise any suitable set of instructions, logic, rules, or code operable to execute the processor 162 and perform the functions described herein, such as some or all of those described in FIGS. 1-3.

The quantum encryption key generator 152 may be implemented by the processor 162 executing the software instruction 168 and configured to generate quantum encryption/decryption keys 150. The quantum encryption key generator 152 is described above with respect to the quantum key distribution node 140. In some embodiments, the quantum key 150 may be generated by the security device 160 and/or the quantum key distribution nodes 140. In some embodiments, quantum keys 150 may distributed among the end-points 120*a-b* by the security device 160 and/or quantum key distribution nodes 140.

The quantum encryption algorithm 154 may be implemented by the processor 162 executing software instructions 168 and is generally configured to encrypt data packets 104 with encryption keys 150. In some embodiments, the quantum encryption algorithm 154 may be implemented by a computing device using the quantum key 150 to encrypt and decrypt data packet 104. In some embodiments, the security device 160 utilizes quantum encryption algorithms 154 to secure data transmissions between network nodes, such as the end-point devices 120*a-b*, quantum key distribution nodes 140, and other devices that are authorized to send and receive data packets 104. In some embodiments, the quantum encryption algorithms 154 (e.g., quantum key distribution algorithms) enable the generation and distribution of cryptographic keys with unconditional security. This may mitigate the risk of interception and eavesdropping by malicious actors. The quantum-secured communication channels allow for end-to-end confidentiality and integrity of data packets 104 and lead to protection of sensitive information from unauthorized access or tampering.

In some embodiments, the system 100 implements decentralized identity management systems by using the blockchain network 130. For example, the system 100 (e.g., via the security device 160) may store the list 222 of authorized devices (e.g., end-point devices 120*a-b*) that are determined to be authorized to send and receive data packets 104 in the blockchain 136 as a part of the records 138. Each network participant (e.g., end-point devices 120*a-b*) is assigned a unique cryptographic identifier to be used for authentication and access control. Storing records of the authorized devices (e.g., as part of the records 138) in a distributed database 134 may facilitate tamper-resistant storage of identity records. This reduces the risk of identity theft or impersonation. Smart contracts implemented by the blockchain 136 govern identity verification processes which enables seamless integration with existing authentication frameworks and regulatory requirements.

In some embodiments, the security device 160 employs a multi-layered approach to enforce data security and compliance standards, particularly when data is shared with external parties (e.g., end-point devices 120 that are external to the organization 112). In some embodiments, the security device 160 may monitor the security posture of the data shared with external entities through decentralized consensus mechanisms implemented by the blockchain network 130. Smart contract-enabled network nodes 132*a-b* validate the adherence of third-party entities to predefined security standards, including encryption protocols, access controls, and data usage policies. Any deviation from these standards triggers an automatic alert within the network to signal potential security risks or compliance violations.

In the event of a security breach or non-compliance by an external party, security device 160 may initiate a bidirectional alerting system. In this process, notifications are sent to the organization 112, security device 160, and the external end-point device 120 to inform them of the security incident and necessary remedial actions. This feedback loop facilitates that both parties are aware of the issue and take corrective measures to mitigate risks and maintain compliance.

In some embodiments, the security device 160 may use smart contracts within each data packet 104 to enable self-enforcement of data governance rules. These smart contracts define the security and compliance requirements for the data packet 104, including encryption standards, access controls, and permissible uses. Smart contracts are immutable and self-executing to ensure that data governance rules are enforced autonomously without reliance on centralized authorities or manual interventions.

In some embodiments, the security device 160 may maintain an immutable trail of all security-related events and actions, including alerts, access attempts, compliance assessments, and remedial actions, and store them as parts of the records 138 in the blockchain 136. This record 138 can be used to verify data integrity and compliance adherence and facilitates forensic analysis, regulatory reporting, and accountability for all parties involved.

Operational Flow

FIG. 2 illustrates an example operational flow 200 of the system 100 (see FIG. 1) for implementing a quantum-based data validation, according to one or more embodiments. In some embodiments, the operational flow 200 may be implemented for every data packet transmission in the network 110. For example, operational flow 200 may be implemented when a user at an end-point device 120*a* may initiate sending a data packet 104 to another user at the end-point device 120*b*. In some embodiments, the operational flow 200 may be implemented in response to a generation of a data packet 104. For example, the data packet 104 may be generated by and/or in a software application 129 configured to process data and generate data packets 104.

In operation, the system 100 may implement the quantum-based data validation by generating and distributing the quantum keys 150 among the end-point devices 120*a-b*. In some embodiments, the security device 160 may be given the list 222 of authorized end-point devices 120*a-b* and store it in the blockchain 136 as parts of the records 138.

Quantum Key Generation and Distribution

In some embodiments, the security device 160 and/or the quantum key distribution network that includes the nodes 140 may initiate the quantum key generation and distribution process 212. In some embodiments, the security device 160 may send a request message 210 to the quantum key distribution nodes 140, where the request message 210 indicates to generate quantum keys 150 for the data packets 104 and distribute the quantum keys 150 among the end-point devices 120*a-b*. In response, the quantum key distribution nodes 140 may generate quantum keys 150 using the quantum encryption key generator 152, similar to that described in FIG. 1. In some embodiments, a different quantum key 150 may be generated for each data packet 104.

In some embodiments, the security device 160 may generate the quantum keys 150 for data packet transmission and evaluation, and distribute the quantum keys 150 among the end-point devices 120*a-b* using the quantum encryption key generator 152, similar to that described in FIG. 1. In some embodiments, the quantum key 150 may be generated by the quantum encryption key generator 152 (e.g., quantum key distribution algorithms), and/or the like to establish a secure quantum key exchange among the set of end-point devices 120*a-b* to validate data packet transmissions.

In some embodiments, upon the quantum keys 150 being generated, the quantum key distribution nodes 140 may encapsulate the data packets 104 in a data container 214. In this process, the quantum key distribution nodes 140 may encrypt the data packet 104 with the quantum encryption key 150. In some embodiments, the security device 160 may encrypt the data packet 104 with the quantum encryption key 150 by the quantum key distribution algorithms (e.g., quantum encryption key generator 152), similar to that described in FIG. 1.

In some embodiments, encrypting the data packet 104 with the quantum key 150 may include using Qubits to encrypt the data packet 104. For example, encrypting the data packet 104 with the quantum key 150 may include encoding the data packet 104 into a unique quantum state using the Qubits of the quantum key 150. In response, the encrypted data packet 104 is included in a data container 214 for a secure data transmission. If a bad actor attempts to access or decrypt the data packet 104, the quantum state of the quantum key 150 gets disturbed. This event may be used as a trigger to inform the security device 160, the end-point device(s) 120*a-b* involved in the data packet transmission about the unauthorized attempt to access the data packet 104, similar to that described in FIG. 1. The data packet 104 encrypted with the quantum key 150 may be stored in the blockchain network 130 by the quantum key distribution nodes 140 and/or the security device 160.

Detecting an Anomaly With Respect to Data Packet

In some embodiments, the security device 160 may detect an anomaly with respect to the data packet 104. In an example scenario, assume that a first user at the end-point device 120*a* wants to communicate the data packet 104 to another user at the end-point device 120*b*. In this example, the security device 160 may detect this event and intercept the data packet 104 before its transmission. For example, the security device 160 may receive a request indicating the transmission of the packet 104 from the user device 120*a* to the user device 120*b*. In response, the security device 160 may determine whether the data packet 104 is valid/secured by determining whether the data packet 104 is encrypted with the quantum key 150. In some embodiments, the data packet 104 may be encrypted with the quantum key 150 by the user device 120*a* using quantum encryption algorithms 154, similar to that described in FIG. 1.

In some embodiments, the data packet 104 may be encrypted with the security device 160 using quantum encryption algorithms 154 (similar to that described in FIG. 1), and provided to the user device 120*a*. If it is determined that the data packet 104 is encrypted with the quantum key 150, the security device 160 may determine that the data packet 104 is secured and authorized for transmission. In response, the security device 160 may establish a quantum communication channel between the user device 120*a* and user device 120*b*, where the quantum communication channel may be implemented by the quantum key distribution where quantum keys 150 are distributed among the user devices 120*a-b* for data transmission and reception validation. In response to establishing the quantum communication channel between the user device 120*a* and user device 120*b*, the security device 160 may transmit the data packet 104 encrypted with the quantum key 150 to the user device 120*b* or allow the user device 120*a* to transmit the data packet 104 encrypted with the quantum key 150 to the user device 120*b*.

In another example scenario, the security device 160 and/or authorized end-point device(s) 120*a-b* may detect an authorized attempt to access the data packet 104 when the quantum state of the quantum key 150 gets disturbed. In this example scenario, assume that the data packet 104 is in transit along a network path or at a user device 120*a-b*. Also, assume that a bad actor attempts to access the data packet 104 by intercepting the data packet 104 or sending a request to access the data packet 104. Upon the bad actor's attempt, the quantum state of the quantum key 150 gets disturbed due to quantum mechanics principles which state any observation of a quantum particle alters its state. In response, the security device 160 and/or authorized end-point device(s) 120*a-b* may detect this anomaly. Further in response, the security device 160 and/or authorized end-point device(s) 120*a-b* may perform one or more countermeasure actions. In some examples, the countermeasure actions may include generating an alert message indicating the detected anomaly and sending the alert messages to network administrators, generating a new quantum key 150 and distributing among the authorized end-point devices 120*a-b*, encrypting the data packet 104 with the new quantum key 150, storing the event in the blockchain 136, adding the identifier associated with the requesting device to a firewall policy as anomalous, among others. The security device 160 and/or the network nodes 132*a-b* may generate a new block for this event and store it in the blockchain 136. This information may be used by the security device 160 to further improve identifying, detecting, and mitigating future instances of unauthorized attempts to access data packets 104.

Evaluating a Request to Access Data Packet

In some cases, while the data packet 104 is being transmitted via a network or when the data packet 104 is at a device (e.g., end-point device 120*a-b*, network node 132*a-n*, etc.), an attempt to access the data packet 104 may be detected. The security device 160 may act as a gateway device that monitors network traffic among the end-point devices 120*a-b* and network nodes 132*a-b*. The security device 160 may detect a request message 216 to access the data packet 104. The request message 216 may be intended for any end-point device 120*a-b*, and the security device 160 may intercept the request message 216. The request message 216 may include an identifier 218 of a requesting device 220. In some cases, the request message 216 may not include the identifier 218 of the requesting device 220. In such cases, the security device 160 may determine the identifier 218 of the requesting device 220 based on the headers associated with the request message 216. In response to detecting and/or receiving the request message 216, the security device 160 may determine whether the request message 216 originated from an authorized entity. In this process, the security device 160 may determine whether the identifier 218 associated with the requesting device 220 is recorded as an authorized entity in the records 138 stored in the blockchain 136.

The identifier 218 associated with the requesting device 220 may include an internet protocol (IP) address, a cryptographic identifier (if the receiving device is previously provided with a cryptographic identifier, a media access control (MAC) address, or any other unique identifier. If it is determined that the identifier 218 of the requesting device 220 is not among the list 222 of authorized devices stored in the records 138, the security device 160 may determine that the requesting device 220 is not authorized to access the data packet 104. In response, the security device 160 may determine that the request message 216 is originated from an unauthorized entity and deny the request to access the data packet 104 to the requesting device 220. If it is determined that the identifier 218 of the requesting device 220 is found in the list 222 of authorized devices in the records 138, the security device 160 may grant access of the data packet 104 to the requesting device 220. The requesting device 220 may be an instance of an end-point device 120*a-b* described in FIG. 1. The security device 160 and/or the network nodes 132*a-b* may generate a new block for this event and store it in the blockchain 136. This information may be used by the security device 160 to further improve identifying, detecting, and mitigating future instances of unauthorized attempts to access data packets 104.

Example Method for Implementing Quantum-Based Data Validation

FIG. 3 illustrates an example flowchart of a method 300 for implementing quantum-based data validation, according to some embodiments. Modifications, additions, or omissions may be made to method 300. Method 300 may include more, fewer, or other operations. For example, operations may be performed in parallel or in any suitable order. While at times it is discussed that the system 100, user devices 120*a-b*, blockchain network 130, quantum key distribution nodes 140, security device 160, or components of any of thereof perform some operations, any suitable system or components of the system may perform one or more operations of the method 300. For example, one or more operations of method 300 may be implemented, at least in part, in the form of software instructions 128, 148, 168 of FIG. 1, stored on a tangible non-transitory computer-readable medium (e.g., memory 126, 146, 166 of FIG. 1) that when run by one or more processors (e.g., processor 122, 142, 162 of FIG. 1) may cause the one or more processors to perform operations 302-316.

At operation 302, the security device 160 may generate a quantum key 150 for data packet transmissions, similar to that described in FIG. 2.

At operation 304, the security device 160 may distribute the quantum key 150 among the set of end-point devices 120*a-b*, similar to that described in FIG. 2.

At operation 306, the security device 160 may encrypt the data packet 104 with the quantum key 150, similar to that described in FIG. 2.

At operation 308, the security device 160 may store the encrypted data packet 104 in a blockchain network 130, similar to that described in FIG. 2.

At operation 310, the security device 160 receives a request message 216 to access the data packet 104, where the request message 216 includes an identifier associated with a requesting device 220, similar to that described in FIG. 2.

At operation 312, the security device 160 determines whether the requesting device 220 is authorized to access the data packet 104. For example, the security device 160 may determine whether the requesting device 220 is authorized to access the data packet 104*by* determining whether the identifier associated with the requesting device 220 is recorded as an authorized entity in the blockchain network 130, similar to that described in FIG. 2. If it is determined that the requesting device 220 is authorized to access the data packet 104, the method 300 may proceed to operation 316. Otherwise, the method 300 may proceed to operation 314. At operation 314, the security device 160 may deny access of the data packet 104 to the requesting device 220. The security device 160 may perform one or more countermeasure actions similar to that described in FIG. 2. At operation 316, the security device 160 may grant access of the data packet 104 to the requesting device 220.

While several embodiments have been provided in the present disclosure, it should be understood that the system 100 and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented. In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein. To aid the Patent Office, and any readers of any patent issued on this application in interpreting the claims appended hereto, applicants note that they do not intend any of the appended claims to invoke 35 U.S.C. § 112(f), as it exists on the date of filing hereof, unless the words "means for" or "step for" are explicitly used in the particular claim.

The invention claimed is:

1. A system comprising:
- a memory configured to store a data packet; and
- a processor, operably coupled with the memory, and configured to:
  - generate a quantum key for data packet transmissions;
  - distribute the quantum key among a set of end-point devices, wherein each of the set of end-point devices is an authorized device;
  - encrypt the data packet with the quantum key;
  - store the encrypted data packet in a blockchain database;
  - receive a request message to access the encrypted data packet, wherein the request message comprises an identifier associated with a requesting device; and
  - in response to receiving the request message:
    - determine whether the request message is originated from an authorized entity by determining whether the identifier associated with the requesting device is recorded as an authorized entity in the blockchain database;
    - in response to determining that the request message is originated from an authorized entity, grant access of the encrypted data packet to the requesting device; and
  - while the encrypted data packet is along a network path to the requesting device;
    - detect an attempt to access the encrypted data packet from another device;
    - determine that a quantum state associated with the quantum key of the encrypted data packet is disturbed; and
    - in response to determining that the quantum state associated with the quantum key of the encrypted data packet is disturbed;
      - generate a new quantum key for the data packet;
      - encrypt the data packet with the new quantum key; and
      - add an identifier associated with the other device to a firewall policy.

2. The system of claim 1, wherein the processor is further configured to deny access of the encrypted data packet in response to determining that the identifier associated with the requesting device is not recorded as an authorized entity in the blockchain database.

3. The system of claim 1, wherein the quantum key is generated by a quantum key distribution (QKD) algorithm to establish a secure quantum key exchange among the set of end-point devices to validate data packet transmissions.

4. The system of claim 1, wherein encrypting the data packet with the quantum key comprises using quantum bits (Qubits) to encrypt the data packet.

5. The system of claim 1, wherein the processor is further configured to store a record of the set of end-point devices as authorized devices in the blockchain database.

6. The system of claim 1, wherein a first end-point device from among the set of end-point devices is internal with respect to an organization with which a second end-point device is associated.

7. The system of claim 1, wherein a first end-point device from among the set of end-point devices is external with respect to an organization with which a second end-point device is associated.

8. A method comprising:
- generating a quantum key for data packet transmissions;
- distributing the quantum key among a set of end-point devices, wherein each of the set of end-point devices is an authorized device;
- encrypting a data packet with the quantum key;
- storing the encrypted data packet in a blockchain database;
- receiving a request message to access the encrypted data packet, wherein the request message comprises an identifier associated with a requesting device; and
- in response to receiving the request message:
  - determining whether the request message is originated from an authorized entity by determining whether the identifier associated with the requesting device is recorded as an authorized entity in the blockchain database;
  - in response to determining that the request message is originated from an authorized entity, granting access of the encrypted data packet to the requesting device; and
  - while the encrypted data packet is along a network path to the requesting device;
    - detecting an attempt to access the encrypted data packet from another device;
    - determining that a quantum state associated with the quantum key of the encrypted data packet is disturbed; and
    - in response to determining that the quantum state associated with the quantum key of the encrypted data packet is disturbed;

generating a new quantum key for the data packet;
encrypting the data packet with the new quantum key; and add an identifier associated with the other device to a firewall policy.

9. The method of claim 8, further comprising denying access of the encrypted data packet in response to determining that the identifier associated with the requesting device is not recorded as an authorized entity in the blockchain database.

10. The method of claim 8, wherein the quantum key is generated by a quantum key distribution (QKD) algorithm to establish a secure quantum key exchange among the set of end-point devices to validate data packet transmissions.

11. The method of claim 8, wherein encrypting the data packet with the quantum key comprises using quantum bits (Qubits) to encrypt the data packet.

12. The method of claim 8, further comprising storing a record of the set of end-point devices as authorized devices in the blockchain database.

13. The method of claim 8, wherein a first end-point device from among the set of end-point devices is internal with respect to an organization with which a second end-point device is associated.

14. The method of claim 8, wherein a first end-point device from among the set of end-point devices is external with respect to an organization with which a second end-point device is associated.

15. A non-transitory computer-readable medium that stores instructions, wherein when the instructions are executed by a processor, cause the processor to:

generate a quantum key for data packet transmissions;

distribute the quantum key among a set of end-point devices, wherein each of the set of end-point devices is an authorized device;

encrypt a data packet with the quantum key;

store the encrypted data packet in a blockchain database;

receive a request message to access the encrypted data packet, wherein the request message comprises an identifier associated with a requesting device; and in response to receiving the request message:

determine whether the request message is originated from an authorized entity by determining whether the identifier associated with the requesting device is recorded as an authorized entity in the blockchain database;

in response to determining that the request message is originated from an authorized entity, grant access of the encrypted data packet to the requesting device; and while the encrypted data packet is along a network path to the requesting device;

detect an attempt to access the encrypted data packet from another device;

determine that a quantum state associated with the quantum key of the encrypted data packet is disturbed; and in response to determining that the quantum state associated with the quantum key of the encrypted data packet is disturbed;

generate a new quantum key for the data packet;

encrypt the data packet with the new quantum key; and add an identifier associated with the other device to a firewall policy.

16. The non-transitory computer-readable medium of claim 15, wherein the instructions further cause the processor to deny access of the data packet in response to determining that the identifier associated with the requesting device is not recorded as an authorized entity in the blockchain database.

17. The non-transitory computer-readable medium of claim 15, wherein the quantum key is generated by a quantum key distribution (QKD) algorithm to establish a secure quantum key exchange among the set of end-point devices to validate data packet transmissions.

18. The non-transitory computer-readable medium of claim 15, wherein encrypting the data packet with the quantum key comprises using quantum bits (Qubits) to encrypt the data packet.

19. The non-transitory computer-readable medium of claim 15, wherein the instructions further cause the processor to store a record of the set of end-point devices as authorized devices in the blockchain database.

20. The non-transitory computer-readable medium of claim 15, wherein a first end-point device from among the set of end-point devices is external with respect to an organization with which a second end-point device is associated.

* * * * *